(12) United States Patent
Endler

(10) Patent No.: US 12,410,601 B2
(45) Date of Patent: Sep. 9, 2025

(54) SEWER INSPECTION AND/OR MAINTENANCE SYSTEM

(71) Applicant: iPEK International GmbH, Sulzberg (DE)

(72) Inventor: Hannes Endler, Kempten (DE)

(73) Assignee: iPEK International GmbH, Sulzberg (DE)

( * ) Notice: Subject to any disclaimer, the term of this patent is extended or adjusted under 35 U.S.C. 154(b) by 320 days.

(21) Appl. No.: 17/735,773

(22) Filed: May 3, 2022

(65) Prior Publication Data

US 2022/0356695 A1 Nov. 10, 2022

(30) Foreign Application Priority Data

May 4, 2021 (EP) .................................. 21171967

(51) Int. Cl.
*E03F 7/00* (2006.01)
*H04B 5/45* (2024.01)

(52) U.S. Cl.
CPC . *E03F 7/00* (2013.01); *H04B 5/45* (2024.01)

(58) Field of Classification Search
CPC .................. E03F 7/00; E03E 7/12; H04B 5/45
See application file for complete search history.

(56) References Cited

U.S. PATENT DOCUMENTS

| | | | | |
|---|---|---|---|---|
| 3,400,574 | A * | 9/1968 | Cramer | G01M 3/2853 33/1 H |
| 9,482,582 | B2 * | 11/2016 | Kreutzer | G01J 5/05 |
| 10,641,676 | B1 * | 5/2020 | Cruz | G06K 7/10425 |
| 11,002,399 | B2 * | 5/2021 | Zahnd | F16L 55/40 |
| 11,284,043 | B2 * | 3/2022 | Endler | G03B 37/005 |
| 12,044,657 | B2 * | 7/2024 | Rehman | G01N 29/26 |

FOREIGN PATENT DOCUMENTS

| | | | | |
|---|---|---|---|---|
| DE | 19820783 | A1 * | 9/1999 | ............... E03F 7/12 |
| DE | 202011100462 | U1 | 7/2011 | |
| DE | 202012003028 | U1 * | 5/2012 | ......... G03B 37/005 |
| DE | 102012108500 | B3 * | 3/2014 | ............... G01J 5/04 |
| DE | 202014105998 | U1 | 8/2015 | |
| DE | 202015101277 | U1 | 6/2016 | |
| DE | 102013211795 | B4 * | 7/2020 | ............... E03F 7/12 |
| DE | 102022132956 | A1 * | 6/2024 | |
| EP | 202014105998 | | * | 8/2015 |

OTHER PUBLICATIONS

Extended European Search Report issued for International Patent Application No. EP21171967.9 dated Nov. 11, 2021.

* cited by examiner

*Primary Examiner* — Octavia Hollington
(74) *Attorney, Agent, or Firm* — Myers Wolin, LLC

(57) ABSTRACT

A sewer inspection and/or maintenance system includes a base unit and at least one system component which can be arranged on the base unit, wherein a transponder is arranged on the system component, and a reading device is arranged on the base unit, wherein the transponder is adapted to provide data identifying the system component, and the reading device is adapted to receive the data provided by the transponder from the transponder without contact or to read them out from the transponder without contact.

16 Claims, 4 Drawing Sheets

SEWER INSPECTION AND/OR MAINTENANCE SYSTEM

CROSS REFERENCE TO RELATED APPLICATIONS

This application claims priority under 35 U.S.C. § 119 to European Patent Application No. 21 171 967.9, filed on May 4, 2021, the contents of which are incorporated herein by reference in their entirety.

TECHNICAL FIELD

The disclosure relates to a sewer inspection and/or maintenance system, comprising a base unit and at least one system component which can be arranged on the base unit, and to a method for determining a configuration of a sewer inspection and/or maintenance system.

BACKGROUND

Sewer inspection and/or maintenance systems are known from the related art. From DE 10 2012 108 500 A1, for example, a sewer inspection system is known comprising an inspection vehicle, wherein a camera, a temperature measuring apparatus, and a plurality of wheels are arranged on the inspection vehicle. However, a sewer inspection system can also be designed as a sliding system, in which the camera and various measuring apparatuses are arranged on a sliding unit. A lifting unit can also be arranged on a crawler of a sewer inspection system, as is known, for example, from DE 10 2011 015 080 A1. A camera and possibly lighting devices can be arranged on such a lifting unit. Correspondingly, manipulators, for example grippers or milling machines, can also be arranged on the crawler or on the sliding unit.

It is therefore known from the related art to have a crawler or a sliding unit with different system components (cameras, sensors, manipulators, wheels, lifting units, crawler elevations, extensions for lifting devices, egg profiles, etc.) and to replace these system components with other system components if necessary. For example, the wheels of a crawler can be fitted with different wheels depending on the diameter of the sewer to be inspected/maintained.

The disadvantage in this case, however, is that the user/operator of such a sewer inspection and/or maintenance system does not receive any feedback from the system itself as to which system components it is currently equipped with. This is particularly disadvantageous when the user cannot distinguish certain system components solely from the outside or when certain system components are arranged inside the crawler housing or inside the sliding unit. For example, wheels with soft tires or wheels with hard tires can be arranged on the crawler, with these wheels not being distinguishable solely from the outside.

Therefore, before a maintenance or inspection process, the user must carefully check the configuration of the sewer inspection and/or maintenance system in order to ensure that the system is correctly configured for the corresponding process. Despite the greatest care, errors can occur in this case, since certain components cannot be distinguished or cannot be easily distinguished solely from the outside, such as the wheels mentioned above, which wheels have tires of different hardness. As a result, it may only be recognized during a maintenance or inspection process that the system is equipped with incorrect or unsuitable components. The maintenance or inspection process can be significantly delayed in this case due to retooling.

SUMMARY

The object of the present disclosure is therefore to provide solutions which at least partially avoid the disadvantages known from the related art, and which make it possible to determine a configuration of a sewer inspection and/or maintenance system simply, quickly, and above all reliably.

This object is achieved with a sewer inspection and/or maintenance system and a method according to the claims. Advantageous embodiments and developments of the disclosure are specified in the claims.

Accordingly, a sewer inspection and/or maintenance system is provided, comprising a base unit and at least one system component which can be arranged on the base unit, wherein
  a transponder is arranged on the system component, and
  a reading device is arranged on the base unit,
wherein
  the transponder is adapted to provide data identifying the system component, and
  the reading device is adapted to receive the data provided by the transponder from the transponder without contact or to read them out from the transponder without contact.

The at least one system component can be arranged or can be arrangeable directly on the base unit. However, the at least one system component can also be arranged or can be arrangeable indirectly on the base unit, i.e. further components or system components can be arranged or can be arrangeable between the system component and the base unit.

With the help of the reading device and the transponder, in which case one transponder can be provided on each of the plurality of system components, it is advantageously possible for the reading device to be able to receive data from the transponder and make these data available to the user. The configuration of the sewer inspection and/or maintenance system is made available to the user based on these data (i.e. data identifying the corresponding system component), so that the user can also check the current configuration of the sewer inspection and/or maintenance system without an inspection of said configuration.

It is also advantageous in this case that the complete configuration of the sewer inspection and/or maintenance system can be visualized on an operating unit or control unit. This avoids the operator having to enter the configuration manually; incorrect entries are thus effectively avoided. In addition, the operator can be shown, for example, for which pipe diameter the current configuration of the sewer inspection and/or maintenance system can be used.

A substantial advantage of the disclosure is that no electrical connection or coupling has to be provided between the system component and the base unit in order to transmit data identifying the system component to the base unit. A current configuration of the sewer inspection and/or maintenance system can thus be completely determined even if solely mechanical system components are also arranged on the base unit.

It can be advantageous in this case if the reading device can read out the data of a transponder immediately after the arrangement or installation of the corresponding system component on the base unit and make it available to the user (for visualization on the operating unit or control unit). In this way, the user can already check and monitor the configuration of the base unit during the retooling time and, if necessary, intervene early if an incorrect system component is arranged on the base unit.

It is advantageous if the system components can be detachably arranged on the base unit. Individual system components can be replaced by other system components or removed entirely if necessary.

In one embodiment of the disclosure, it can be advantageous if
- the sewer inspection and/or maintenance system comprises a control unit which is arranged outside the base unit,
- a data processing device which is coupled to the reading device is arranged on the base unit, and
- the data processing device is adapted to receive the data received or read out by the reading device and to transmit them to the control unit via a communication connection.

The user can also remotely check the current configuration of the sewer inspection and/or maintenance system.

In one embodiment of the disclosure, the transponder can have at least one sensor device and/or be coupled to at least one sensor device. The transponder is further adapted to receive sensor data from the sensor device and to provide the received sensor data to the reading device, and the reading device is further adapted to receive the sensor data provided by the transponder from the transponder without contact or to read them out from the transponder without contact.

In this way, not only can the current configuration of the sewer inspection and/or maintenance system be determined, but sensor data recorded by the sensors of the system components can also be determined together with the configuration of the sewer inspection and/or maintenance system. It is advantageous in this case that, in addition to the configuration of the sewer inspection and/or maintenance system, the sensor data can also be visualized on the operating unit or control unit, with the sensor data being able to be assigned to specific system components. The assignment of the sensor data to the corresponding system component can take place, for example, via a unique identifier identifying the corresponding system component.

In one embodiment of the disclosure, the reading device can be adapted to supply the transponder with electrical energy.

In an alternative configuration, the transponder can be adapted to obtain the electrical energy required for its operation by means of energy harvesting.

In yet another embodiment of the disclosure, the transponder can be equipped with a battery or an accumulator for energy supply.

The control unit can be adapted to identify, based on the transmitted data (i.e. based on the data received from the base unit), a configuration of the base unit with the at least one system component arranged on the base unit. Furthermore, the control unit can be adapted to visualize the configuration of the base unit with the at least one system component arranged on the base unit. If system components have a sensor unit, the control unit can be further adapted to also visualize sensor data from the sensor units.

The base unit may comprise a crawler or a sliding camera.

It can be advantageous if the transponder is arranged within the system component.

In a particularly advantageous embodiment, the transponder can be arranged in a gas-tight and/or fluid-tight manner within the system component.

In one embodiment of the disclosure, the transponder can also be arranged on the outside of the system component. In this case, "on the outside" means that the transponder is arranged on an outer surface of the system component or is fastened to an outer surface of the system component. The transponder can comprise a radio tag that is fastened, for example glued, to the outside of the system component. Alternatively, the transponder can also be designed as a transponder module that is fastened, for example screwed on, to the outside of the system component. If the transponder is provided as a transponder module, it can be advantageous if said transponder module has a gas-tight and/or fluid-tight housing in which the electronic components of the transponder are arranged.

Of course, system components can also be arranged on the base unit, the transponder being arranged inside the system component for some system components, and the transponder being arranged outside of the system component for some system components.

Also provided is a method for determining a configuration of a sewer inspection and/or maintenance system comprising a base unit and at least one system component which is arranged on the base unit, wherein a transponder is arranged on the system component, or the system component has a transponder, and a reading device is arranged on the base unit, wherein
- the transponder provides data identifying the system component, and
- the reading device receives the data provided by the transponder from the transponder without contact or reads them out from the transponder without contact.

It is advantageous if the system components are detachably arranged on the base unit. This means that the system components can be exchanged if necessary and the configuration of the sewer inspection and/or maintenance system can be changed or adapted, with the transponder and the reading device being used to determine the configuration immediately after the system components have been changed.

In one embodiment of the disclosure, it can be advantageous if the system components can be activated before they are arranged on the base unit and/or after they have been arranged on the base unit. This can reliably prevent a system component (or the transponder of the system component) located in the detection range of the reading device which is not arranged or installed on the base unit from being incorrectly recognized as a system component which is arranged or installed on the base unit (if, for example, a wheel is next to the base unit and the transponder of this wheel is in the detection range of the reading device).

To activate the corresponding system component, the system component and/or the base unit can have activation means, for example:
- a reed contact in the transponder and a magnet in the base unit, the magnet activating the transponder via the reed contact;
- an accelerometer in the system component, which accelerometer is coupled to the transponder and activates the transponder when the acceleration sensor detects a predetermined gesture or movement. It can be advantageous in this case if a plurality of system components are only activated when the accelerometers of these system components detect the same gesture or movement, preferably within a certain period of time. For example, in the case of the base unit after the installation of the system components, a movement must be completed so that all accelerometers of the installed system components detect this movement substantially simultaneously. The accelerometers of the system components not installed on the base unit do not detect this movement and can thus be recognized as "not installed" system components, even if the transponders of these system components are in the detection range of the reading device.

Depending on the design of the system component, the activation means can also be a mechanical switch or the like.

The activation means mentioned above are to be understood as activation means solely by way of example. Depending on the system component and the design of the system component, activation can also take place in other ways. It is substantial to the disclosure in one embodiment of the disclosure that the system components can be activated in order to ensure that system components which are not arranged on the base unit are incorrectly recognized as system components which are arranged on the base unit.

The system can comprise a control unit which is arranged outside of the base unit, and a data processing device which is coupled to the reading device can be arranged on the base unit, wherein the data processing device receives the data received or read out by the reading device and transmits them to the control unit via a communication connection. The communication connection can be a wired or wireless communication connection.

It can be advantageous if the transponder has at least one sensor device and/or is coupled to at least one sensor device, wherein the transponder provides sensor data from the sensor device and the reading device receives the sensor data provided by the transponder from the transponder without contact or reads them out from the transponder without contact. The sensor data can also be transmitted from the data processing device to the control unit via the communication connection.

The reading device can supply the transponder with electrical energy. The energy supply can take place wirelessly in this case, for example on an inductive basis. Other wireless energy supply techniques are also possible.

In one embodiment of the disclosure, the transponder can have a storage for storing electrical energy, such as a battery or an accumulator.

In yet another embodiment of the disclosure, the transponder can obtain the electrical energy required for its operation by means of energy harvesting.

It is advantageous if the control unit identifies, based on the transmitted data, a configuration of the base unit with the at least one system component arranged on the base unit. The configuration of the base unit can be displayed on a display device (e.g. a display) of the control unit. The control unit can be designed to recognize an incorrect configuration and output a corresponding warning on the display device. An incorrect configuration can be, for example, if one of the four wheels installed on a crawler has a different diameter than the other wheels.

The system component or system components can be: crawler wheels, lifting devices, turning devices, camera modules, lighting devices, manipulators, crawler elevations, extensions for lifting devices, egg profiles, or the like. The system components mentioned are merely examples, and the disclosure is not limited thereto.

BRIEF DESCRIPTION OF THE DRAWINGS

Further details and features of the disclosures as well as specific, in particular advantageous, embodiments of the disclosure are apparent from the following description in conjunction with the drawings, in which.

DETAILED DESCRIPTION

Embodiments of a sewer inspection and/or maintenance system according to the disclosure are described in more detail below. The corresponding sewer inspection and/or maintenance system is also referred to in this case as an inspection system.

Figure 1:
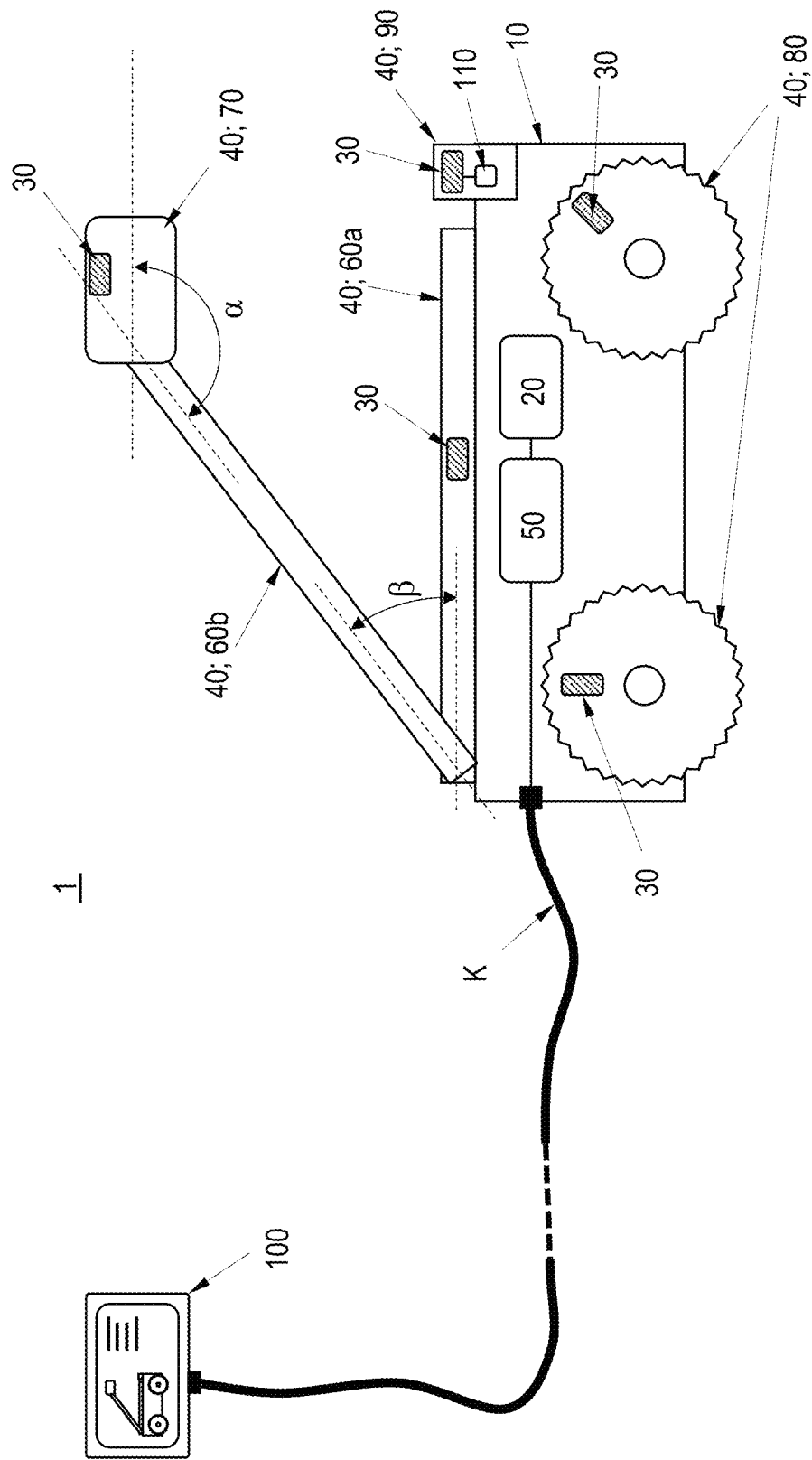
FIG. 1 shows a first inventive embodiment of a sewer inspection and/or maintenance system having a base unit designed as a crawler and system components arranged thereon.

FIG. 1 shows a first inventive embodiment of a sewer inspection and/or maintenance system.

The inspection system 1 in this case comprises a base unit 10 designed as a crawler having system components 40, 60a, 60b, 70, 80, 90 arranged thereon.

The base unit 10 is coupled via a communication connection K to a control unit 100 which is usually arranged outside the sewer to be inspected or maintained. In FIG. 1, the communication connection K is designed as a wired connection. In one embodiment of the disclosure, however, the communication connection K can also be designed in the form of a wireless connection. In the case of a wired communication connection, it can be advantageous to supply the crawler 10 with electrical energy via the cable. In the case of a wireless communication connection, it has proven to be advantageous to equip the crawler 10 with a battery or with an accumulator; the crawler 10 can thus be operated completely wirelessly.

The control unit 100 in this case comprises a display device on which the base unit 10 having the system components 40 arranged thereon can be visualized. The current configuration of the inspection system can be visualized by the user without him having to look at the inspection system directly. The user can then see at a glance whether the inspection system is correctly configured for the planned inspection/maintenance.

In the example shown in FIG. 1, a plurality of system components 40 are arranged on the crawler 10, namely a base 60a or base unit of a lifting device, a lifting arm 60b of the lifting device, a camera 70, a plurality of crawler wheels 80, and a temperature measuring device 90. According to the disclosure, other or additional system components 40 can also be arranged on the crawler 10.

According to the disclosure, each of the system components has a transponder 30, for example an RFID transponder, with the transponders 30 being adapted to provide data identifying the corresponding system component 40. For example, the transponders 30 can be adapted to provide a unique identifier for the corresponding system component.

A reading device 20, such as an RFID reading device, is arranged on the base unit or on the crawler 10, with which reading device the data provided by the transponders 30 of the system components 40 can be read out without contact. In one embodiment of the disclosure, the reading device can read out the unique identifier assigned to the corresponding system component from the RFID transponders. In the case of large crawlers 10, a plurality of reading devices 20 can also be arranged in a distributed manner on the crawler, for example when the electric or electromagnetic field of a reading device 20 does not reach far enough to reach all of the transponders 30.

The advantage of using transponders which can be read out without contact according to the disclosure is that no electrical plug connections have to be provided between the respective system components and the crawler. This reduces the complexity of the crawler and the system components. On the other hand, the system components can be arranged anywhere and flexibly on the crawler without having to take electrical plug connections into account. For example, the system component 90 shown in FIG. 1 and embodied as a temperature measuring device can be fastened at any desired location on the crawler. The system components designed as wheels 80 can be installed on the wheel axles of the crawler in the usual way without having to take any electrical connections into account. The avoidance of such electrical contacts also has the advantage that the number of components that are susceptible to wear and tear and require maintenance is reduced or kept low.

A further advantage of the transponders according to the disclosure is that contamination has no effect on being able to determine the current configuration of the crawler, because contamination can pose a significant problem, in particular in the case of sewer inspection and maintenance systems.

A still further and substantial advantage is that both the transponder 30 and the reading device 20 can be hermetically protected in the respective system components 40 or in the crawler. The wear and tear and external influences, which occur in particular in channels, can thus be significantly reduced and the service life of the transponders can be significantly increased. The transponders can be accommodated, for example, in a hermetic, i.e. gas- and fluid-tight housing.

The transponders 30 contained in the system components 40 can be active or passive transponders. In the case of passive transponders, such as RFID transponders, the transponder is supplied with energy by means of the electromagnetic field generated by the reading device 20 and the transmission of data takes place from the transponder to the reading device. In the case of active transponders, the energy supply of the transponder can take place using its own power supply, for example using a battery assigned to the transponder.

The identifiers (data) of the system components 40 read out by the reading device 20 from the individual transponders 30 are transmitted to the control unit 100 via the communication connection K in a wireless or wired manner. The transmission of the data is preferably taken over by a data processing device 50 which is also arranged in the base unit 10 or in the crawler. The data processing device 50 is coupled to the reading device 20 and is adapted to process the data provided by the reading device, i.e. the data that the reading device 20 has read out from the corresponding transponder 30, and to transmit them to the control unit 100. The processing of the data by the data processing device 50 can comprise processing according to a predetermined transmission protocol.

In one embodiment of the disclosure, the data processing device 50 can be coupled to a storage device 130 in order to store the data from the reading device, for example if a transmission of data to the control unit is not possible.

In one embodiment of the disclosure, the data processing device 50 can be adapted to monitor the assembly of system components 40 and to inform the worker in the event of incorrect installation, for example by means of an optical or acoustic signal. For this purpose, a number of possible or permissible configurations of the crawler can be stored in the data processing device 50 or in the storage device 130. The data processing device 50 and the storage device 130 can be designed as an integral unit. When installing a system component, the data processing device can then carry out a comparison with the stored configurations and, if necessary, inform the worker. This is particularly advantageous when different system components cannot be distinguished solely from the outside, or can only be distinguished with great difficulty. Two wheels having different tire hardnesses can look almost identical, but they may not be used together on one crawler or one of the two wheels on the specific crawler may not be used at all. If the worker now attaches the (impermissible) wheel to the crawler, the reading device 20 can read out the identifier of the wheel and the data processing device can carry out a corresponding comparison for this identifier. The advantage in this case is that the configuration can already be monitored easily during the retooling time, thus avoiding later retooling, for example if the crawler first has to be removed from the sewer for retooling.

It can be advantageous if the transponders not only provide an identifier for the corresponding system component 40, but also other data which can be queried by the reading device. These further data can be sensor data; for example. FIG. 1 shows an example of a system component 40 designed in this way, namely the system component 90 which is designed as a temperature measuring device. The temperature measuring device 90 has a transponder 30 and a temperature sensor 110. The temperature sensor 110 is operatively coupled to the transponder 30 in such a way that the reading device 20 can read out not only the identifier of the transponder (or the identifier of the system component 90) but also the measured value provided by the temperature sensor from the transponder.

Another example of such further data is the angle α between the system component 70 designed as a camera and the system component 60*b* designed as a lifting arm. An angle sensor can be arranged in the camera 70 (or in or on the camera housing), which angle sensor measures the angle α between the lifting arm 60*b* and, for example, the optical axis of the camera 70 and which is operatively coupled to the transponder 30 of the camera 70. In a corresponding manner, the angle β between the lifting arm 60*b* and the base unit 60*a* can also be determined with the help of an angle measuring device and made available to the reading device via the transponder 30 arranged in the base unit 60*a* for reading out from the transponder.

The transponders 30 of the system components 40 designed as wheels 80 can, for example, each be operatively coupled to a tire pressure sensor, so that the reading device 20 can also read out the tire pressure of the corresponding wheel via the transponder 30.

In addition to the identifiers of the transponders or the system components, the data processing device 50 can also transmit these further data to the control unit 100, where said data can be visualized if necessary.

The identifiers of the system components and the other data can be stored in the control unit 100 or also in the storage device 130 of the crawler for the purpose of complete documentation of a sewer inspection or sewer maintenance. For this purpose, the reading device 20 can be adapted to query the identifiers of the transponders and possibly the other data at regular time intervals (e.g. every 5 minutes) and to store them in the storage device 130 or to transmit them to the control unit 100.

Figure 2:
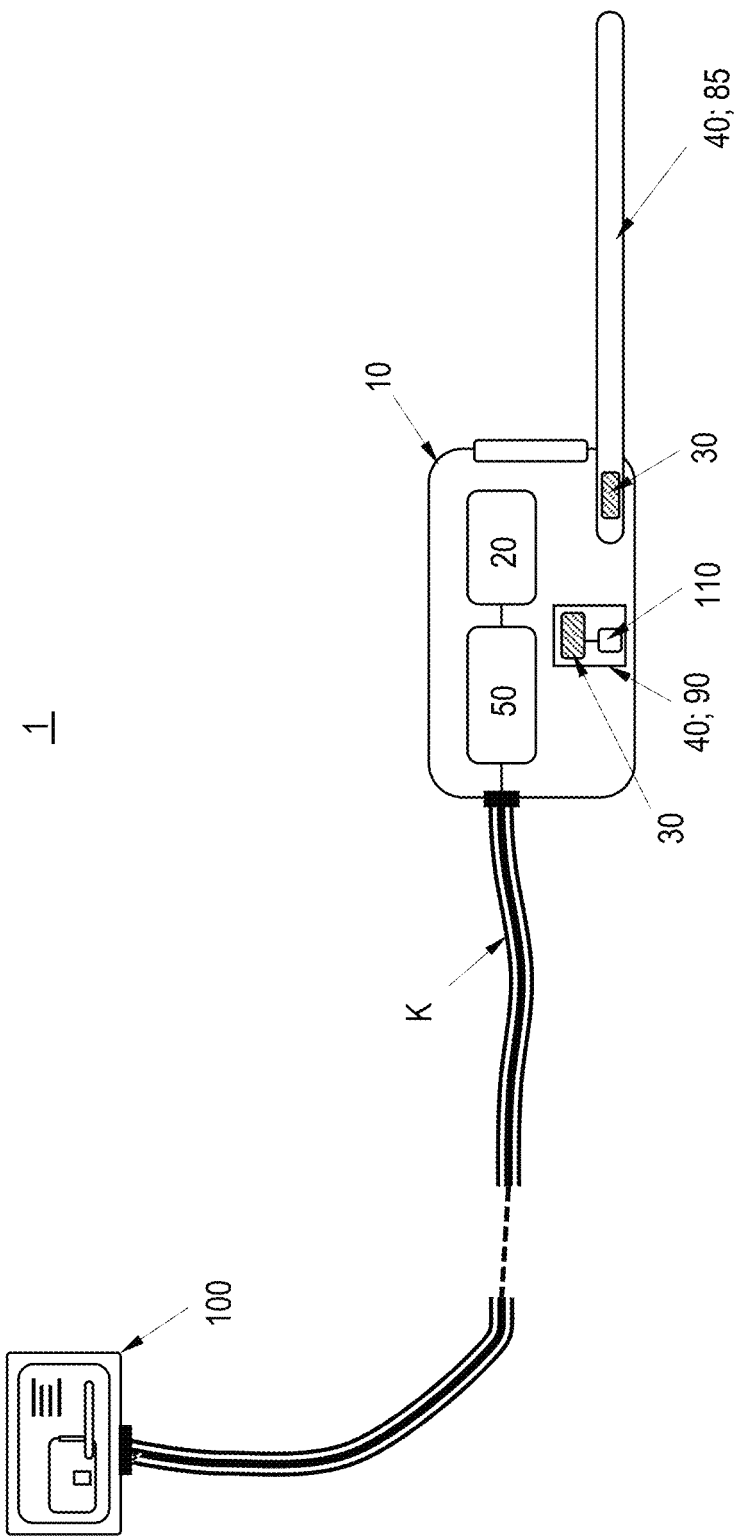
FIG. 2 shows a second inventive embodiment of a sewer inspection and/or maintenance system having a base unit designed as a sliding system and system components arranged thereon.

FIG. 2 shows a second embodiment according to the disclosure of a sewer inspection and/or maintenance system.

In this case, the inspection system 1 comprises a base unit 10 designed as a sliding system having system components 40, 85, 90 arranged thereon.

The base unit 10 is advanced in the sewer by means of a sliding cable or sliding rod. The communication connection K between the base unit 10 and the control unit 100, if it is a wired communication connection K, can be formed in the sliding rod. However, the communication connection K can also be designed in the form of a wireless connection.

In the example of a sliding system shown in FIG. 2, a plurality of system components 40 are arranged on the base unit 10, namely a camera 70, a turning rod 85, and a temperature measuring device 90. These three system components are preferably detachably arranged on the base unit 10 and each have a transponder 30.

A reading device 20 is also arranged on the base unit 10, with which reading device the unique identifiers of the system components 40 or the corresponding transponder 40 can be queried. In this case, too, the reading device 20 can make the queried identifiers available to a data processing device 50 which then transmits them via the communication connection K to the control unit 100, optionally after processing.

As explained above with regard to FIG. 1, the system components 40 shown in FIG. 2 can also have sensor devices 110 which can provide further data for a query by the reading device 20. FIG. 2 shows a system component designed as a temperature measuring device 90 which has a temperature sensor.

The system component designed as a turning rod 85 can also have a sensor, for example an angle sensor (not shown in FIG. 2), with which the angle between the housing of the base unit and the turning rod can be determined.

The functionality of the reading device 20 and the transponder 30 corresponds to the functionality described above for FIG. 1.

Other or additional sensors can also be provided, the sensor data of which can be queried using the transponder and reading device. For example, force sensors can be provided with which the forces acting on the turning rod 85 or with which the tensile forces acting on the sliding cable or other cables can be measured.

Figure 3:
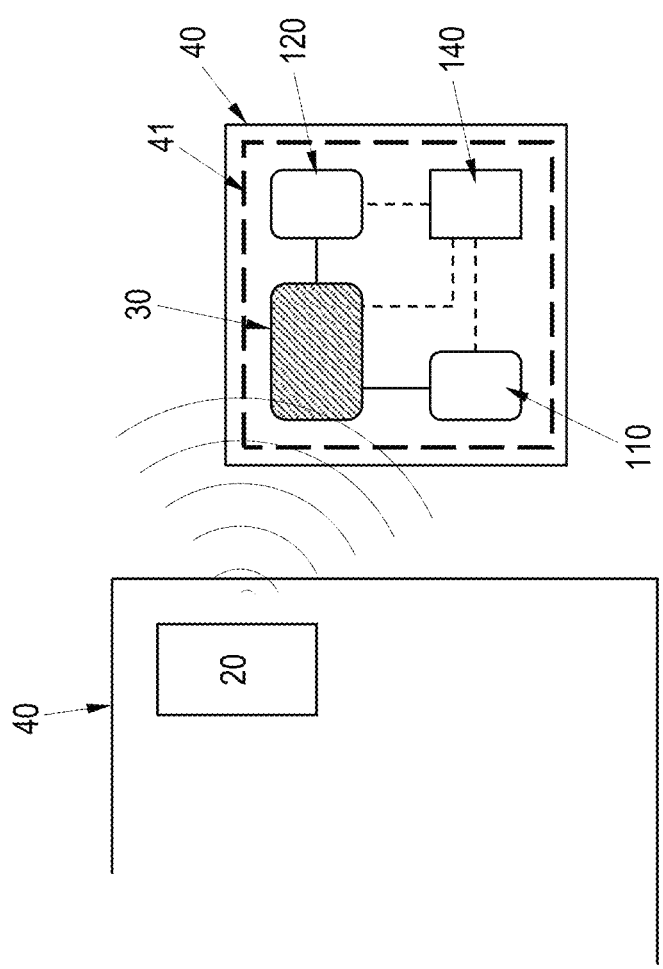
FIG. 3 is a detailed view of a system component according to a possible embodiment of the disclosure.

FIG. 3 shows an example of a detailed view of a system component as a block diagram according to a possible embodiment of the disclosure.

In the example shown in this case, the system component 40 comprises:
a transponder 30 which, according to one embodiment of the disclosure, is designed as an RFID transponder,
a sensor device 110 which can optionally be present,
a storage device 120 which can also optionally be present, and
a power supply 140 which can also optionally be present.

The transponder 30 is operatively connected to the sensor device 110 in this case, with the measured values determined by the sensor device 110 being made available to the transponder 30 as measured data.

The transponder 30 is also operatively coupled to a storage device 120 in this case. The storage device can be provided to store or temporarily store the measured values of the sensor device 110. However, the storage device 120 can also store the identifier of the system component 40 or of the transponder 30.

Furthermore, the transponder 30 is coupled to a power supply 140 in this case. The power supply can also be coupled to the sensor device 110 and/or the storage device 120. The power supply can be designed in the form of a battery or an accumulator. With appropriate electronics, the accumulator can obtain the energy required for charging the accumulator from the electric field of the reading device 20. The energy supply 140 is particularly advantageous when the transponder 30 is only queried at certain time intervals, but the measured values of the sensor device are to be recorded continuously (i.e. at shorter time intervals). The measured values can then be temporarily stored in the storage device until the next query.

The components 30, 110, 120, and 140 can be designed as an integral transponder module 41. Such a transponder module can then be easily arranged or fastened to a system component 40.

Alternatively, the transponder module 41 can also only have the transponder 30 and the storage device 120. The transponder module can then have one or more interfaces via which one or more sensor devices can be connected to the transponder module 41.

Figure 4C:
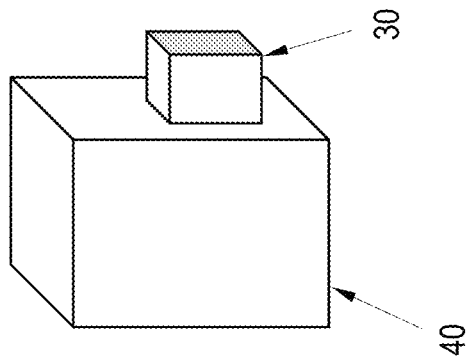
FIGS. 4A-4C show three examples of a transponder arranged on the system component.
Figure 4B:
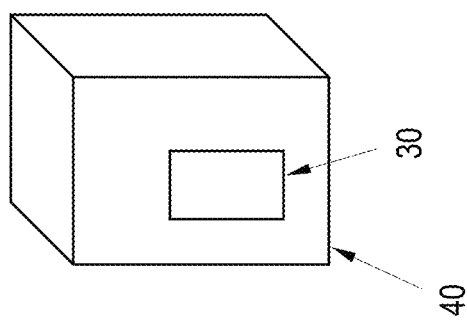
Figure 4A:
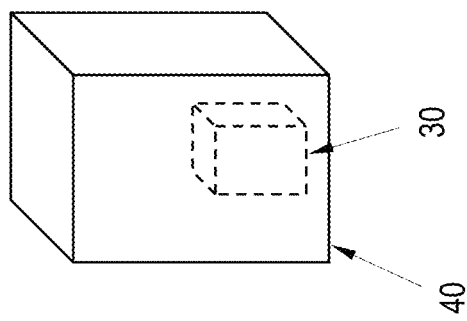

FIGS. 4A to 4C show three examples of a transponder arranged on the system component, both the system component and the transponder being shown only schematically in this case.

FIG. 4A shows a system component 40 in which the transponder 30 is arranged within the system component 40. In this case, the system component 40 can comprise a housing within which the transponder 30 is arranged. In one embodiment of the disclosure, the housing of the system component 40 can be designed to be fluid-tight and/or gas-tight. The transponder 30 itself can also comprise a housing within which the electronic components of the transponder are arranged. The housing of the transponder can be designed to be gas- and/or fluid-tight.

FIG. 4B shows a system component 40 in which the transponder 30 is arranged outside of the system component 40. The transponder 30 is designed in this case as a radio tag that is fastened to an outside of the system component 40, for example glued to a housing wall of the system component. A transponder designed as a radio tag can also be arranged within the system component, as shown in FIG. 4A.

FIG. 4C shows a system component 40 in which the transponder 30 is arranged outside of the system component 40. The transponder 30 is in this case designed as a transponder module which is screwed onto the outside of the system component 40 or mechanically fastened in some other way. The transponder module can comprise a fluid- and/or gas-tight housing in which the electronic components of the transponder are arranged.

Embodiments of the disclosure were mentioned above in which the transponder is designed as an RFID transponder and the reading device is designed as an RFID reading device. However, the disclosure is not limited to RFID technology. In fact, other radio technologies can also be used, for example Bluetooth, Bluetooth Low Energy, ZigBee, or NFC.

The disclosure brings a plurality of advantages. First of all, any system component can be provided with a transponder or with a transponder module. When arranging a system component on the base unit, the reading device can read out the identifier of the transponder and, if necessary, further data (e.g. sensor data). Based on the identifiers and if necessary the further data, it is possible to present the current configuration of the sewer inspection and/or maintenance system to the user, for example for him to visualize it on a display device of a control unit. The user can thus check the configuration of the sewer inspection and/or maintenance system independently of a physical inspection, not only before an inspection and/or maintenance process but during the entire inspection and/or maintenance process. It is particularly advantageous in this case that no electrical connection or coupling (such as a cable or plug) has to be provided between the system component and the base unit.

REFERENCE SIGNS

1 Sewer inspection and/or maintenance system
10 Base unit, e.g. crawler or sliding system
20 Reading device
30 Transponder
40 System component
41 Transponder module
50 Data processing device
60a System component, e.g. base of a lifting device
60b System component, e.g. lifting arm of a lifting device
70 System component, e.g. camera
80 System component, e.g. crawler wheels
85 System component, e.g. turning rod
90 System component, e.g. temperature measuring device
100 Control unit
110 Sensor device (optional)
120 Storage device of the system component 40 (optional)
130 Storage device of the base unit 10 (optional)
140 Power supply (e.g. accumulator, optional)
K Communication connection, wireless or wired

The invention claimed is:

1. A sewer inspection and/or maintenance system comprising a base unit and at least one system component arranged on the base unit, wherein
a transponder which is readable without contact is arranged on the system component, and
a reading device is arranged on the base unit,
wherein
the transponder is adapted to provide data identifying the system component, and
the reading device is adapted to read out the data from the transponder without contact.

2. The system according to claim 1, wherein the at least one system component is detachably arranged on the base unit.

3. The system according to claim 1, wherein
the system comprises a control unit which is arranged outside the base unit,
a data processing device which is coupled to the reading device is arranged on the base unit,
the data processing device is adapted to receive the data received or read out by the reading device and to transmit them to the control unit via a communication connection.

4. The system according to claim 3, wherein the control unit is adapted to identify, based on the transmitted data, a configuration of the base unit with the at least one system component arranged on the base unit.

5. The system according to claim 1, wherein the transponder comprises at least one sensor device and/or is coupled to at least one sensor device, wherein the transponder is further adapted to provide sensor data to the sensor device, and wherein the reading device is adapted to receive the sensor data provided by the transponder from the transponder without contact or to read them out from the transponder without contact.

6. The system according to claim 1, wherein the reading device is adapted to supply the transponder with electrical energy.

7. The system according to claim 1, wherein the transponder is adapted to obtain the electrical energy required for its operation by means of energy harvesting, or wherein the transponder is equipped with a battery or an accumulator for the energy supply.

8. The system according to claim 1, wherein the base unit comprises a crawler or a sliding camera.

9. The system according to claim 1, wherein the transponder is arranged within the system component or wherein the transponder is arranged outside of the system component.

10. A method for determining a configuration of a sewer inspection and/or maintenance system comprising a base unit and at least one system component which is arranged on the base unit, wherein a transponder which is readable without contact is arranged on the system component, and a reading device is arranged on the base unit,
wherein
the transponder provides data identifying the system component, and
the reading device reads out the data from the transponder without contact.

11. The method according to claim 10, wherein the at least one system component is detachably arranged on the base unit.

12. The method according to claim 10, wherein the system comprises a control unit which is arranged outside the base unit, and a data processing device which is coupled to the reading device is arranged on the base unit, wherein the data processing device receives the data received or read out by the reading device and transmits them to the control unit via a communication connection.

13. The method according to claim 12, wherein the control unit identifies, based on the transmitted data, a configuration of the base unit with the at least one system component arranged on the base unit.

14. The method according to claim 10, wherein the transponder comprises at least one sensor device and/or is coupled to at least one sensor device, wherein the transponder provides sensor data to the sensor device, and the reading device receives the sensor data provided by the transponder from the transponder without contact or reads them out from the transponder without contact.

15. The method according to claim 10, wherein the reading device supplies the transponder with electrical energy.

16. The method according to claim 10, wherein the transponder obtains the electrical energy required for its operation by means of energy harvesting or wherein the transponder is supplied with electrical energy using a battery or an accumulator.

* * * * *